No. 888,384. PATENTED MAY 19, 1908.
H. F. BECHMAN.
MULTICOLOR PRINTING PRESS.
APPLICATION FILED MAY 31, 1907.
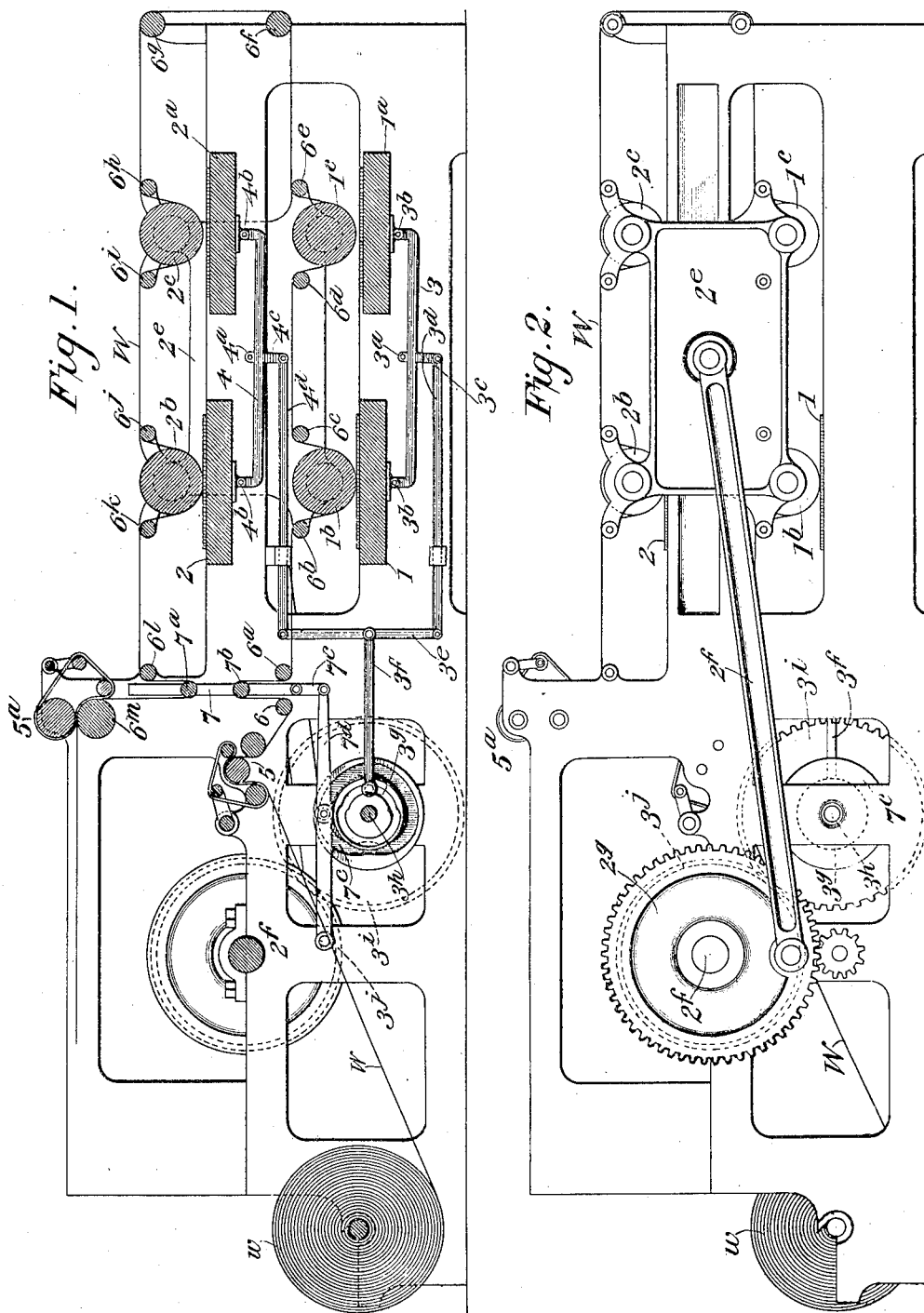

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN, A CORPORATION OF MICHIGAN.

MULTICOLOR-PRINTING PRESS.

No. 888,384.　　　　Specification of Letters Patent.　　　Patented May 19, 1908.

Application filed May 31, 1907. Serial No. 376,678.

*To all whom it may concern:*

Be it known that I, HENRY F. BECHMAN, of Battle Creek, in the county of Calhoun and State of Michigan, have invented certain new and useful Improvements in Multicolor-Printing Presses; and I hereby declare that the following is a full, clear, and exact description thereof, reference being had to the accompanying drawings, which form part of this specification.

This invention is an improvement in web printing presses preferably employing reciprocating cylinders and relatively stationary beds, and the object of the present invention is to enable such machine to print in one or more colors, and, if desired, to have the cylinders print either simultaneously or in alternation, for which purpose the impression can be thrown off by means of novel mechanism hereinafter explained.

The invention will be more fully understood by reference to the accompanying drawings in connection with the following description of the machine illustrated therein, and I refer to the claims for summaries of the parts and combinations thereof for which protection is desired.

In the drawings—Figure 1 is a diagrammatical longitudinal sectional elevation of the press. Fig. 2 is a side view thereof.

As shown in the drawings the press has two type beds 1 and 1ª, preferably arranged adjacent, end to end, in one plane; and two type beds 2 and 2ª, preferably arranged end to end in one plane, and above and parallel with the beds 1, 1ª.

With the beds 1 and 1ª coöperate cylinders 1ᵇ, 1ᶜ, and with beds 2, 2ª, co-act cylinders 2ᵇ, 2ᶜ. Preferably all said cylinders are journaled in reciprocating carriers 2ᵉ which are slidably mounted on the side frames of the press and can be operated by pitman 2ᶠ and crank gears 2ᵍ as in the well known deplex press. The beds 1, 1ª; and 2, 2ª; are spaced sufficiently far apart to allow each cylinder to clear the forms on its respective bed without running upon those on the adjacent bed.

In order to throw off the impression, if desired, the beds are made movable so that they can be raised or lowered as desired. For this purpose the beds 1, 1ª, are pivotally connected at 3ᵇ to the opposite ends of a lever 3 which is centrally fulcrumed at 3ª upon a fixed part of the frame. This lever 3 is provided with a depending arm 3ᶜ which is connected by a link 3ᵈ, bar 3ᵉ, and pitman 3ᶠ to a crank or cam 3ᵍ mounted upon a cross shaft 3ʰ in the frame and which shaft may be driven by gears 3ⁱ, 3ʲ, from the main crank shaft 2ᶠ so that links 3ᵈ will be reciprocated once, forward and back, during each rotation of the main shaft 2ᶠ.

The beds 2, 2ª, are similarly connected at 4ᵇ at the opposite end of a lever 4 pivoted at 4ª to a fixed point on the frame and provided with a depending arm 4ᶜ connected by a link 4ᵈ to bar 3ᵉ. It will be seen that when the levers 3 and 4 are rocked on their pivots, the beds 1, 1ª, and 2, 2ª, will be alternately raised and lowered, so that if desired when beds 1 and 2 are on impression, beds 1ª and 2ª can be lowered off impression. Obviously if it is not desired to throw off the impression, link 3ᶠ can be disengaged from cam 3ᵍ or bar 3ᵉ.

The course of the web through the press can be readily followed from the drawings. The web feeding, delivering and looping devices being substantially such as in the duplex press and well understood, it is unnecessary to give a detailed explanation thereof. The web W is led from a roll *w* to the feeding-in devices 5, then under a guide 6, up over looping roller 7ᵇ, down under the guide 6ª, to guide 6ᵇ; then between cylinder 1ᵇ and bed 1 to and over guides 6ᶜ and 6ᵈ; then between bed 1ª and cylinder 1ᶜ, up over guide 6ᵉ, to, under and over guides 6ᶠ, 6ᵇ; back over guide 6ʰ, then between bed 2ª and cylinder 2ᶜ, to and over guides 6ⁱ and 6ʲ; then between bed 2 and cylinder 2ᵇ; then over guides 6ᵏ and 6ˡ; under looping roller 7ª; then over guide 6ᵐ, to feeding-out rolls 5ª; and passed to the folder.

The web may be continuously fed into and delivered from the press, and the part in the press is intermittently stopped and then shifted forward between the beds and cylinders by means of looping rollers 7ᵇ and 7ª substantially as in the duplex press.

The looping rollers 7ª and 7ᵇ can be mounted on a frame 7 connected by a link 7ᶜ to a vibrating lever 7ᵈ, operated by a cam 7ᵉ on shaft 3ʰ as indicated in the drawing and as in the duplex press.

It will be observed that the web is led successively under the cylinders 1ᵇ and 1ᶜ, and is then reversed and led successively under cylinders 2ᶜ and 2ᵇ so that it may be printed twice on the same side from the forms on beds 1, 1ª, and then perfected and printed twice on the opposite side from the forms on beds 2, 2ª. By this arrangement a short length paper can be printed in multi-color, or a longer paper printed in one color; that is, in printing in multi-color, the web may be printed in black on beds 1 and 2 and in colors on beds 1ª, 2ª; suitable inking mechanism, not shown, being provided. Or if not desired to print in color, one portion of the web can be printed on beds 1 and 2 and another portion on beds 1ª and 2ª. The amount of web fed and delivered for each impression will be regulated by the speed of the feed and delivery mechanisms 5, 5ª, and the looping rollers 7ª, 7ᵇ, will have a length of travel sufficient to take up the web during impression and give it off after impression. When not printing in colors twice the length of the web could be printed in one color for each operation of the machine as could be printed in multi-color at each operation thereof. When the throw-off mechanism is used the cylinders 1ᵇ, 1ᶜ, will print alternately, so will cylinders 2ᵇ, 2ᶜ. If the throw-off mechanism be put out of operation, the beds can be set so that the cylinders can print on both forward and backward strokes, the feeding and looping mechanism being speeded accordingly as in the duplex press. When the press is used in this manner, the beds may be made fast in intermediate position, and the cylinders can be packed sufficiently to cause them to press the paper on to the type on both strokes; or the type-forms can be underlaid sufficiently to bring the type into contact with the paper. Either way is well known and can be used at the option of pressman.

The press described has considerable range, and can print as many as sixteen pages in one color with a single row of forms on each bed, if the beds be four forms wide; or can print eight pages in two colors with the same number of forms.

Having described my invention what I claim as new and desire to secure by Letters Patent is:

1. In a printing press, the combination of four beds and four cylinders co-acting therewith, and means for directing a web between two beds and cylinders to be printed on one side, and then between the remaining beds and cylinders to be printed on the opposite side, and means for throwing off impression so that the cylinders that print the same side of the web print alternately and on alternate strokes with respect to each other.

2. In a printing press, the combination of four beds and four cylinders co-acting therewith, and means for directing a web between two beds and cylinders to be printed on one side, and then between the remaining beds and cylinders to be printed on the opposite side; with means for continuously feeding a web to and delivering it from the press, means for looping the web between the feeding mechanism and the printing devices, and between the printing devices and the delivering mechanism, and means for throwing off impression so that the cylinders which print the same side of the web print alternately and on alternate strokes with respect to each other.

3. In a printing press, the combination of four beds and four cylinders co-acting therewith, and means for directing a web between two adjacent beds and cylinders to be printed on one side, and then between the remaining two adjacent beds and cylinders to be printed on the opposite side; means for continuously feeding a web to and delivering it from the press, and means for looping the web, and means for throwing the adjacent sets of beds alternately off impression so that the cylinders print on alternate strokes.

4. In a printing press, the combination of four beds and four cylinders co-acting therewith, and means for directing a web between two beds and cylinders to be printed on one side, and then between the remaining beds and cylinders to be printed on the opposite side; with means for throwing the beds alternately off-impression so that the cylinders print on alternate strokes.

5. The combination in a printing press, of a pair of beds and co-acting cylinders adapted to print one side of the web, a second pair of beds and co-acting cylinders, adapted to print the opposite side of the web, means for directing a web successively between the beds and cylinders in one pair, and then between the beds and cylinders in the other pair; and means for alternately raising and lowering the beds in each pair so that the cylinders of each pair print in alternation.

6. The combination in a printing press, of a pair of beds and co-acting cylinders adapted to print one side of the web, a second pair of beds and co-acting cylinders adapted to print the opposite side of the web; means for directing a web successively between the beds and cylinders of one pair, and then between the beds and cylinders of the opposite pair; means for alternately raising and lowering the beds in each pair so that the cylinders of each pair print in alternation; with web feeding mechanism, web delivering mechanism and web looping mechanism whereby the web is intermittently shifted between the beds and cylinders.

7. In a printing press, the combination of four beds and four cylinders co-acting therewith, and means for directing a web between two beds and cylinders to be printed on one side in multi-color, and then between the remaining beds and cylinders to be printed on the opposite side in multi-color; means for continuously feeding a web to and delivering it from the press, and means for looping the web between the feeding mechanism and the printing devices, and between the printing devices, and the delivering mechanism, and means for throwing the beds alternately off-impression so that the cylinders print on alternate strokes.

8. The combination in a printing press of a pair of beds and co-acting cylinders adapted to print on one side of the web, a second pair of beds and co-acting cylinders adapted to print the opposite side of the web; means for directing a web successively between the beds and cylinders of one pair, and then between the beds and cylinders of the opposite pair, and means for alternately raising and lowering the beds in each pair so that the cylinders of each pair print in alternation; with web feeding mechanism, web delivering mechanism and web looping mechanism whereby the web is intermittently shifted between the beds and cylinders.

9. The combination in a printing press, of a pair of beds and co-acting cylinders; an oscillating lever supporting the beds, and means for operating said oscillating lever to throw the beds alternately on and off impression.

10. In a printing press, the combination of a pair of beds arranged end to end in substantially the same plane, a pair of cylinders co-acting with said beds; means for directing a web successively between the beds and cylinders, and means for raising and lowering the beds alternately to cause the cylinders to print in alternation.

11. In a printing press, the combination of a pair of beds, a pair of cylinders co-acting with said beds, and means for directing a web between the beds and cylinders; an oscillating lever pivotally connected to the beds, and a cam and connections for oscillating said lever, substantially as described.

12. The combination of a pair of beds arranged substantially in the same plane, a pair of cylinders co-acting with said beds, a second pair of beds arranged in substantially the same plane but located above and parallel with the first beds; a pair of cylinders co-acting with the second pair of beds; means for simultaneously reciprocating the cylinders over their respective beds, means for directing a web successively between one pair of beds and cylinders to be printed on one side, and then between the other pair of beds and cylinders to be perfected; web feeding and delivering devices, a web looping device interposed between the printing mechanisms and the feeding and delivering devices, and means for throwing the beds in each pair alternately in and out of impression position.

In testimony that I claim the foregoing as my own, I affix my signature in presence of two witnesses.

HENRY F. BECHMAN.

Witnesses:
WILLIAM JAMES MOLYNEUX,
FRANK W. DUNNING.